(12) United States Patent
Ishikawa et al.

(10) Patent No.: US 6,332,857 B1
(45) Date of Patent: Dec. 25, 2001

(54) LOADING CAM DEVICE FOR, AN APPARATUS FOR MEASURING THRUST OF A LOADING CAM DEVICE FOR, AND A METHOD OF ASSEMBLING A TOROIDAL-TYPE CONTINUOUSLY VARIABLE TRANSMISSION

(75) Inventors: Kouji Ishikawa, Kanagawa; Kiyotaka Hirata; Mitsuo Kumagae, both of Saitama, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/537,683

(22) Filed: Mar. 29, 2000

(30) Foreign Application Priority Data

Mar. 31, 1999 (JP) .................................................. 11-090927

(51) Int. Cl.⁷ .......................... F16H 15/38; B23P 21/00; G01L 5/00
(52) U.S. Cl. ................... 476/41; 29/407.01; 29/407.08; 29/469; 73/862.322; 476/40; 476/42
(58) Field of Search ............................ 29/407.01, 407.08, 29/469; 73/862.322; 476/40, 41, 42

(56) References Cited

U.S. PATENT DOCUMENTS

| 4,955,246 | 9/1990 | Nakano ................................... 74/200 |
| 5,248,285 | 9/1993 | Nakano .................................. 476/15 |
| 5,267,920 | * 12/1993 | Hibi ....................................... 476/40 |
| 5,299,988 | 4/1994 | Fukushima et al. .................... 476/42 |
| 5,669,274 | 9/1997 | Yokoi et al. ........................... 82/1.11 |

FOREIGN PATENT DOCUMENTS

| 62-71465 | 5/1987 | (JP) | ................................ F16H/15/38 |
| 1-216160 | 8/1989 | (JP) | ................................ F16H/15/38 |
| 1-173552 | 12/1989 | (JP) | ................................ F16H/15/38 |
| 8-145137 | 6/1996 | (JP) | ................................ F16H/15/38 |
| 11-6550 | 1/1999 | (JP) | ................................ F16H/15/38 |
| 11-210853 | 8/1999 | (JP) | ................................ F16H/15/38 |

* cited by examiner

Primary Examiner—Allan D. Herrmann
(74) Attorney, Agent, or Firm—Sughrue Mion, PLLC

(57) ABSTRACT

In a state where an input shaft 15a, an input side disk 2A and a loading cam device 9 are assembled together, thrust to be generated by the loading cam device 9 is measured. In case where this thrust is within a specified range, the other component parts of a toroidal-type continuously variable transmission are combined with the above assembled parts to thereby produce the toroidal-type continuously variable transmission. Accordingly it is possible to reduce the manufacturing cost of a toroidal-type continuously variable transmission which is excellent in efficiency and durability.

11 Claims, 15 Drawing Sheets

LOADING CAM DEVICE FOR, AN APPARATUS FOR MEASURING THRUST OF A LOADING CAM DEVICE FOR, AND A METHOD OF ASSEMBLING A TOROIDAL-TYPE CONTINUOUSLY VARIABLE TRANSMISSION

BACKGROUND OF THE INVENTION

The present invention relates to a loading cam device for a toroidal-type continuously variable transmission, an apparatus for measuring the thrust of such loading cam device, and a method for assembling a toroidal-type continuously variable transmission; and, in particular, the invention relates to a toroidal-type continuously variable transmission which is used as a change gear unit for a transmission for a vehicle, or as a transmission for various industrial machines.

Conventionally, it has been studied to use, as a transmission for a vehicle, such a toroidal-type continuously variable transmission as shown in FIGS. 11 and 12. In this toroidal-type continuously variable transmission, for example, as disclosed in Japanese Utility Model Publication No. Sho. 62-71465, an input side disk 2 is supported concentrically with an input shaft 1 and output disk 4 is fixed to the end portion of an output shaft 3 disposed concentrically with the input shaft 1. In the inside portion of a casing in which the toroidal-type continuously variable transmission is stored, there are disposed trunnions 6, 6 which are capable of swinging about their respective pivot shafts 5, 5 situated at torsional positions which respectively lie in a direction at right angle to the direction of the input and output shafts 1 and 3 but do not intersect the axes of the input and output shafts 1 and 3, as shown in FIGS. 11 and 12. That is, the trunnions 6, 6 respectively include the pivot shafts 5, 5 on the outer surfaces of their respective two end portions thereof in such a manner that the pivots 5, 5 are disposed concentrically with each other. Also, on the respective intermediate portions of the trunnions 6, 6, there are supported the base end portions of shift shafts 7, 7. Accordingly, by swinging the trunnions 6, 6 about the pivot shafts 5, 5, the inclination angles of the shift shafts 7, 7 can be freely adjusted. On the respective peripheries of the shift shafts 7, 7 which are supported on the trunnions 6, 6, there are rotatably supported power rollers 8, 8. And, the power rollers 8, 8 are respectively held by and between the mutually opposing inner surfaces 2a, 4a of the input side and output side disks 2, 4. The sections of the inner surfaces 2a, 4a are respectively formed in a concave-shaped surface which can be obtained by rotating an arc about the pivot shaft 5. And, the peripheral surfaces 8a, 8a of the power rollers 8, 8, which are respectively formed in a spherically convex-shaped surface, are respectively contacted with the inner surfaces 2a, 4a.

Between the input shaft 1 and input side disk 2, there is interposed a loading cam device 9. While the input side disk 2 is being elastically pressed toward the output side disk 2 by the loading cam device 9, the input side disk 2 can be freely rotated. The loading cam device 9 includes a cam plate 10 which can be rotated together with the input shaft 1, and a plurality of (for example, four) rollers 12, 12 which are rollably held by a retainer 11. On one side surface (in FIGS. 11 and 12, on the left side surface) of the cam plate 10, there is formed a drive side cam surface 13 which is an uneven surface extending in the circumferential direction of the cam plate 10; and, on the outer surface (in FIGS. 11 and 12, on the right side surface) of the input side disk 2, there is formed a driven side cam surface 14 having a similar shape to the drive side cam surface 13. And, the plurality of rollers 12, 12 are supported in such a manner that they can be freely rotated about their respective shafts extending in the radial direction with respect to the center of the input shaft 1.

When the above-structured toroidal-type continuously variable transmission is in operation, in case where the cam plate 10 is rotated with the rotation of the input shaft 1, the drive side cam surface 13 presses the plurality of rollers 12, 12 against the driven side cam surface 14 formed on the outer surface of the input side disk 2. As a result of this, at the same time when the input side disk 2 is pressed by the plurality of rollers 12, 12, the input side disk 2 is rotated due to the mutual pressing movements between the drive and driven side cam surfaces 13, 14 and the plurality of rollers 12, 12. And, the rotation of the input side disk 2 is transmitted through the plurality of power rollers 8, 8 to the output side disk 4, so that the output shaft 3 fixed to the output side disk 4 can be rotated.

To change a rotation speed ratio (change gear ratio) between the input and output shafts 1 and 3, firstly, when carrying out deceleration between the input and output shafts 1 and 3, the trunnions 6, 6 may be swung in a given direction about their respective pivot shafts 5, 5. And, the shift shafts 7, 7 may be inclined in such a manner that the peripheral surfaces 8a, 8a of the power rollers 8, 8, as shown in FIG. 11, can be respectively contacted with the near-to-center portion of the inner surface 2a of the input side disk 2 and the near-to-outer-periphery portion of the inner surface 4a of the output side disk 4. On the other hand, for acceleration, the trunnions 6, 6 may be swung in the opposite direction about their respective pivot shafts 5, 5. And, the shift shafts 7, 7 may be inclined in such a manner that the peripheral surfaces 8a, 8a of the power rollers 8, 8, as shown in FIG. 12, can be respectively contacted with the near-to-outer-periphery portion of the inner surface 2a of the input side disk 2 and the near-to-center portion of the inner surface 4a of the output side disk 4. In case where the inclination angles of the shift shafts 7, 7 are set in the intermediate angle between the inclination angles respectively shown in FIGS. 11 and 12, an intermediate change gear ratio can be obtained between the input and output shafts 1 and 3.

Also, FIGS. 13 and 14 show a more concrete example of a toroidal-type continuously variable transmission which is disclosed in Japanese Utility Model Publication No. Hei. 1-173552. An input side disk 2 and an output side disk 4 are rotatably supported on the periphery of a circular-pipe-shaped input shaft 15 respectively through needle roller bearings 16, 16. Also, a cam plate 10 is spline engaged with the outer peripheral surface of the end portion (in FIG. 13, the left end portion) of the input shaft 15, while a flange portion 17 prevents the cam plate 10 from moving in a direction to go away from the input side disk 2. And, the cam plate 10 and rollers 12, 12 cooperate together in forming a loading cam device 9 of a loading cam type which, in accordance with the rotation of the input shaft 15, rotates the input side disk 2 while pressing against the input side disk 2 toward the output side disk 4. To the output side disk 4, there is connected an output gear 18 through keys 19, 19 in such a manner that the output side disk 2 and output gear 18 are allowed to rotate synchronously with each other.

The respective two end portions of the pair of trunnions 6, 6 are supported on a pair of support plates 20, 20 in such a manner that they can be swung as well as can be shifted in the axial direction (in FIG. 13, in the front and back direction; in, FIG. 14, in the right and left direction) thereof. And, on circular holes 23, 23 portions which are respectively formed in the intermediate portions of the trunnions 6, 6, there are supported shift shafts 7, 7, respectively. And, these shift shafts 7, 7 respectively include support shaft portions 21, 21 and pivot sat portions 22, 22 which extend in parallel to each other but are eccentric with each other. Of these portions, the support shaft portions 21, 21 are respectively supported inwardly of their associated circular holes 23, 23 in such a manner that they can be freely rotated through radial needle roller bearings 24, 24. Also, on the peripheries of the pivot shaft portions 22, 22, there are rotatably supported power rollers 8, 8 through radial needle roller bearings 25, 25.

The pair of shift shafts 7, 7 are disposed at mutually 180° opposite positions with respect to the input shaft 15. Also, a direction, in which the pivot shaft portions 22, 22 of the shift shafts 7, 7 are disposed eccentrically with respect to their associated support shaft portions 21, 21, is the same direction (in FIG. 14, in the reversed right and left direction) with respect to the rotation direction of the input side and output side disks 2 and 4. Also, this eccentric direction is a direction which intersects almost at right angles to the provision direction of the input shaft 15. Therefore, the power rollers 8, 8 are supported in such a manner that they are allowed to shift slightly in the provision direction of the input shaft 15. As a result of this, even in case where the power rollers 8, 8 tend to shift in the axial direction of the input shaft 15 (in FIG. 13, in the right and left direction; in FIG. 14, in the front and back direction) due to the elastic deformation of the component parts that are respectively elastically deformed by large loads applied thereto, such shift tendency of the power rollers 8, 8 can be absorbed without applying unreasonable forces to these component parts.

Also, between the respective outer surfaces of the power rollers 8, 8 and the respective inner surfaces of the intermediate portions of the trunnions 6, 6, there are disposed thrust ball bearings 26, 26 and thrust needle roller bearings 27, 27 sequentially in this order starting from the outer surface sides of the power rollers 8, 8. Of these bearings, the thrust ball bearings 26, 26 are bearings which, while supporting thrust-direction loads applied to the power rollers 8, 8, allow the power rollers 8, 8 to rotate. Each of the thrust ball bearings 26, 26 comprises a plurality of balls 29, 29, a circular-ring-shaped retainer 28 for holding the balls 29 in a freely rollable manner, and a circular-ring-shaped outer race 30. In each thrust ball bearing 26, its inner race raceway is formed in the outer surface of the power roller 8, while its outer race raceway is formed in the inner surface of the outer race 30.

Also, each of the thrust needle roller bearings 27, 27 includes a race 31, a retainer 32, and a plurality of needle rollers 33, 33. Of them, the race 31 and retainer 32 are combined together in such a manner that they are allowed to shift slightly in the rotation direction thereof. The thus structured thrust needle roller bearings 27, 27 respectively hold the races 31, 31 between the inner surfaces of the trunnions 6, 6 and the outer surfaces of the outer races 30, 30 while the races 31, 31 are respectively contacted with the inner surfaces of the trunnions 6, 6. The thrust needle roller bearings 27, 27 respectively support thrust loads applied from the power rollers 8, 8 to the outer races 30, 30 as well as allow the pivot shaft portions 22, 22 and outer races 30, 30 to swing about the support shaft portions 21, 21.

Further, to the one-end portions (in FIG. 14, the left end portions) of the trunnions 6, 6, there are connected drive rods 36, 36, respectively and, to the outer peripheral surfaces of the intermediate portions of these drive rods 36, 36, there are fixedly secured drive pistons 37, 37. And, these drive pistons 37, 37 are fitted into drive cylinders 38, 38 in an oil tight manner, respectively.

In the above-structured toroidal-type continuously variable transmission, the rotation of the input shaft 15 is transmitted through the loading cam device 9 to the input side disk 2. And, the rotation of the input side disk 2 is transmitted through the pair of power rollers 8, 8 to the output side disk 4, and further the rotation of the output side disk 4 is taken out by the output gear 18. To change a rotation speed ratio between the input shaft 15 and output gear 18, the pair of drive pistons 37, 37 may be shifted in the mutually opposite directions. With the shifting movements of the drive pistons 37, 37, the pair of trunnions 6, 6 are respectively shifted in the mutually opposite directions: for example, the power roller 8 situated on the lower side in FIG. 14 is shifted to the right in FIG. 14 and the power roller 8 situated on the upper side in FIG. 14 is shifted to the left in FIG. 14, respectively. This changes the direction of the tangential-direction forces that are applied to the contact portions between the peripheral surfaces 8a, 8a of the power rollers 8, 8 and the inner surfaces 2a, 4a of the input side disk 2 and output side disk 4. And, with such change in these forces, the trunnions 6, 6 are swung about the pivot shaft 5, 5 pivotally supported on the support plates 20, 20 in the mutually opposite directions. As a result of this, as shown in FIGS. 11 and 12, the contact positions between the peripheral surfaces 8a, 8a of the power rollers 8, 8 and the inner surfaces 2a, 4a of the input side disk 2 and output side disk 4 are respectively changed, thereby changing the rotation speed ratio between the input shaft 15 and output gear 18.

By the way, when transmitting the rotation force between the input shaft 15 and output gear 18 in this manner, the power rollers 8, 8 are shifted in the axial direction of the input shaft 15 due to the elastic deformation of the component parts, so that the shift shafts 7, 7 pivotally supporting the power rollers 8, 8 are rotated slightly about their respective support shaft portions 21, 21. As a result of this slight rotation, the outer surfaces of the outer races 30, 30 of the thrust ball bearings 26, 26 and the inner surfaces of the trunnions 6, 6 are caused to shift with respect to each other. A force necessary for this relative shift is small because the thrust needle roller bearings 27, 27 are interposed between the outer surfaces of the outer races 30, 30 of the thrust ball bearings 26, 26 and the inner surfaces of the trunnions 6, 6. Therefore, as described above, the inclination angles of the shift shafts 7, 7 can be changed by a small force.

Further, in order to be able to increase the torque that can be transmitted, conventionally, there is also known a structure in which, as shown in FIGS. 15 and 16, on the periphery of an input shaft 15a, there are disposed input side disks 2A, 2B and output side disks 4, 4 by twos, and these input side disks 2A, 2B and output side disks 4, 4 are arranged in parallel to each other with respect to the transmission direction of power. In either of the structures shown in FIGS. 15 and 16, an output gear 18a is supported on the periphery of the intermediate portion of the input shaft 15a in such a manner that the output gear 18a can be freely rotated with respect to the input shaft 15a, while the output side disks 4, 4 are respectively spline engaged with the two end portions of the cylindrical portion that is formed in the central portion of the output gear 18a. And, between the inner peripheral surfaces of the output side disks 4, 4 and the outer peripheral surface of the input shaft 15a, there are interposed needle roller bearings 16, 16, while the output side disks 4, 4 are respectively supported on the periphery of an input shaft 15a in such a manner that they can be rotated with respect to the input shaft 15a as well as they can be shifted in the axial direction of the input shaft 15a. Also, the input side disks 2A, 2B are respectively supported on the two end portions of the input shaft 15a in such a manner that they can be rotated together with the input shaft 15a. The input shaft 15a can be driven or rotated by a drive shaft 51 through a loading cam device 9. By the way, between the outer peripheral surface of the leading end portion (in FIGS. 15 and 16, the left end portion) of the drive shaft 51 and the inner peripheral surface of the base end portion (in FIGS. 15 and 16, the right end portion) of the input shaft 15a, there is interposed a radial bearing 52 such as a sliding bearing or a needle roller bearing. Therefore, the drive shaft 51 and input shaft 15a are combined together in such a manner that, while they remain disposed concentrically with each other, they are allowed to shift slightly in the rotation direction thereof.

Now, in one input side disk 2A (which is located on the left side in FIGS. 15 and 16), its back surface (the left surface in FIGS. 15 and 16) is butted directly (in the structure shown in FIG. 16) or through a countersunk plate spring 45 having large elasticity (in the structure shown in FIG. 15) against a loading nut 39 to thereby substantially prevent the input side disk 2A from shifting with respect to the input shaft 15a in the axial direction of (in FIGS. 15 and 16, in the right and left direction) of the input shaft 15a. On the other hand, the input side disk 2B disposed opposed to a cam plate 10 is supported by a ball spline 40 on the input shaft 15a in such a manner that it is allowed to shift in the axial direction of the input shaft 15a. And, between the back surface (in FIGS. 15 and 16, the right surface) of the input side disk 2B and the front surface (in FIGS. 15 and 16, the left surface) of the cam plate 10, there are interposed a countersunk plate spring 41 and a thrust needle bearing roller 42 in such a manner that they are connected in series to each other. Of them, the countersunk plate spring 41 plays a role to apply a pre-load to the contact portions between the inner surfaces 2a, 4a of the input side disks 2A, 2B and the peripheral surfaces 8a, 8a of the power rollers 8, 8. Also, the thrust needle roller bearing 42 has a function to allow the mutual relative rotation between the input side disk 2B and the cam plate 10 when the loading cam device 9 is in operation.

Also, in the structure shown in FIG. 15, the output gear 18a is rotatably supported by a pair of angular-type ball bearing 43, 43 on a partition wall 44 formed in the inside of the housing in such a manner that it is prevented against shift in the axial direction thereof. On the other hand, in the structure shown in FIG. 16, the output gear 18a is free to shift in the axial direction thereof. By the way, in a toroidal-type continuously variable transmission of a so called double cavity type in which, as shown in the above-described FIGS. 15 and 16, the input side disks 2A, 2B and output side disks 4, 4 are disposed by twos and arranged in parallel to each other with respect to the transmission direction of power, one or both of the input side disks 2A, 2B disposed opposed to the cam plate 10 is or are supported on the input shaft 15a by the ball spline 40, 40a so as to be free to shift in the axial direction of the input shaft 15a; and, the reason for this is to realize such condition that, while the two input side disks 2A, 2B can be rotated perfectly synchronously with each other, the two input side disks 2A, 2B are allowed to shift with respect to the input shaft 15a in the axial direction thereof in accordance with the elastic deformation of the component parts caused by the operation of the loading cam device 9.

The ball splines 40, 40a, which are disposed so as to realize the above object, respectively comprise inside diameter side ball spline grooves 46 respectively formed in the inner peripheral surfaces of the input side disks 2A, 2B, outside diameter side ball spline grooves 47 formed in the outer peripheral surfaces of the intermediate portions of the input shaft 15a, and a plurality of balls 48, 48 respectively interposed between the ball spline grooves 46, 47 in such a manner that they are free to roll. Also, the ball spline 40, which is used to support the input side disk 2B located on the loading cam device 9 side, secures a securing ring 50 to a securing groove 49 formed in the near-to-inner-surface 2a portion of the inner peripheral surface of the input side disk 2B to thereby prevent the plurality of balls 48, 48 from shifting to the inner surface 2a side of the input side disk 2B, which can thus prevent the balls 48, 48 from slipping out from between the inside diameter side and out-side diameter side ball spline grooves 46, 47. By the way, in the structure shown in FIG. 15, the ball spline 40a, which is used to support the input side disk 2A located on the side distant from the loading cam device 9, secures a securing ring 50a to a securing groove 49a formed in the outer periphery surface of the near-to-leading-end portion (in FIG. 15, the near-to-left-end portion) of the input shaft 15a to thereby prevent the plurality of balls 48, 48 from shifting to the inner surface 2a side of the input side disk 2A.

When assembling the above-structured toroidal-type continuously variable transmission, conventionally, the component parts thereof are assembled sequentially into the inside portion of a housing 53 (see FIG. 14) into which the main body of this toroidal-type continuously variable transmission is to be stored. Therefore, whether the component parts are shifted in position with respect to each other within the estimated dimensional errors thereof or not, and thus whether the component parts can function properly or not can be confirmed only after the component parts are all assembled into the housing 53.

On the other hand, to be able to secure the efficiency and durability of the toroidal-type continuously variable transmission, the position relationship between the component parts thereof must be maintained with high accuracy. For example, in order to be able to secure the above-mentioned efficiency and durability, it is important that the loading cam device 9 generates a given level of thrust as the cam plate 10 is rotated. For instance, in case where the thrust generated is excessively small, there run short the pressures of the contact portions between the inner surfaces 2a, 4a of the input side disks 2A, 2B and the peripheral surfaces 8a, 8a of the power rollers 8, 8 to thereby cause slippage in these contact portions, which in turn causes the toroidal-type continuously variable transmission to idle and thus fail to carry out power transmission. On the other hand, in case where the above thrust is excessively large, the pressures of the contact portions are excessively large, thereby resulting in the shortened rolling fatigue lives of the respective surfaces 2a, 4a, and 8a, 8a.

In view of the above, in case where the thrust generated from the loading cam device 9 in accordance with the estimated dimension errors and shape errors of the component parts of the toroidal-type continuously variable transmission deviates from the design value thereof, in order to reduce such thrust deviation by using other proper parts instead of the improper ones of the component parts, the toroidal-type continuously variable transmission, which has been assembled within the housing 53, must be taken apart to parts and assembled again.

In case where the assembling operation of the toroidal-type continuously variable transmission is carried out in this manner, it is troublesome to manufacture the toroidal-type continuously variable transmission, which makes it impossible to reduce the manufacturing cost thereof.

SUMMARY OF THE INVENTION

The present invention aims at eliminating the drawbacks found in the above-mentioned conventional toroidal-type continuously variable transmissions.

Accordingly, it is an object of the invention to provide a loading cam device for a toroidal-type continuously variable transmission, an apparatus for measuring the same loading cam device, and a method for assembling a toroidal-type continuously variable transmission, all of which are able not only to facilitate the assembling operation of a toroidal-type continuously variable transmission which is used as a change gear unit for a transmission for a vehicle, or as a transmission for various industrial machines, but also to enhance the precision of such assembling operation to thereby improve the performance of the toroidal-type continuously variable transmission.

The above-mentioned object can be achieved by a loading cam device for a toroidal-type continuously variable transmission, according to the present invention, comprising:

an input shaft including a flange portion at its one end portion;
a circular-ring-shaped cam plate supported on the inner surface of the flange portion of the input shaft, the circular-ring-shaped cam plate including, at its inner surface, a drive side cam surface which comprises an uneven surface extending in the circumferential direction of the cam plate;
an input side disk including an outer surface and an inner surface, and the input side disk being supported on the periphery of the input shaft in such a manner that it is allowed not only to shift in the axial direction of the input shaft with respect to the input shaft but also to rotate in synchronization with the input shaft, the outer surface being disposed opposed to the drive side cam surface of the cam plate and formed as a driven side cam surface comprising an uneven surface extending in the circumferential direction of the input side disk, and the inner surface being disposed on the opposite side to the outer surface in the axial direction of the input side disk and formed as a concave-shaped surface having an arc-shaped section;
a plurality of rollers respectively held by and between the drive side cam surface and the driven side cam surface; and,
a retainer for holding the plurality of rollers in a freely rotatable manner,
wherein, of the loading cam device, not only the input shaft, the cam plate, the input side disk, the rollers and the retainer which are parts produced separately from one another, are previously assembled so as to have such position relationship that should be provided after completion of assembly of a toroidal-type continuously variable transmission, before they are actually assembled to the toroidal-type continuously variable transmission, but also the thrust of the loading cam to be generated due to the mutual relative rotation between the cam plate and the input side disk is previously measured.

In the above-mentioned loading cam device for a toroidal-type continuously variable transmission, it is preferable that the cam plate is supported by an angular-type ball bearing in such a manner that it can be freely rotated, and the ball bearing comprises an inner race raceway formed on the inner surface of the flange portion, an outer race raceway formed on the inner peripheral edge portion of the outer surface of the cam plate, and a plurality of balls respectively interposed between the inner race raceway and the outer race raceway in a freely rotatable manner.

In addition, in the above-mentioned loading cam device, it is also preferable that the input side disk is supported through a ball spline.

Further, in the above-mentioned loading cam device, it is also preferable that between the input shaft and the input side disk, there is interposed a countersunk plate spring which is used to apply a pre-load.

Furthermore, in the above-mentioned loading cam device, it is further preferable that between the input shaft and the input side disk, there is further interposed a thrust needle roller bearing.

The above-mentioned object can also be attained by an apparatus for measuring thrust of a loading cam device for a toroidal-type continuously variable transmission, wherein the loading cam device comprises, an input shaft including a flange portion at its one end portion;
a circular-ring-shaped cam plate supported on the inner surface of the flange portion of the input shaft, the circular-ring-shaped cam plate including, at its inner surface, a drive side cam surface which comprises an uneven surface extending in the circumferential direction of the cam plate;
an input side disk including an outer surface and an inner surface, and the input side disk being supported by the input shaft in such a manner that it is allowed not only to shift in the axial direction of the input shaft with respect to the input shaft but also to rotate in synchronization with the input shaft, the outer surface being disposed opposed to the drive side cam surface of the cam plate and formed as a driven side cam surface comprising an uneven surface extending in the circumferential direction of the input side disk, and the inner surface being disposed on the opposite side to the outer surface in the axial direction of the input side disk and formed as a concave-shaped surface having an arc-shaped section;
a plurality of rollers respectively held by and between the drive side cam surface and the driven side cam surface; and
a retainer for holding the plurality of rollers in a freely rotatable manner,
wherein the thrust measuring device comprises:
a drive member for rotationally driving the cam plate;
a retaining member for preventing the input disk from shifting in a direction where the input side disk goes away from the cam plate; and
a sensor for measuring a thrust load applied to the input side disk due to the rotation of the cam plate driven by the drive member, and
wherein the sensor measures the thrust of the loading cam device which includes the drive side cam surface, the driven side cam surface and the rollers, in a state where the input shaft, the cam plate, the input side disk, the rollers and the retainer are previously assembled so as to have such positional relationship that is provided after completion of assembly of the toroidal-type continuously variable transmission before they are actually assembled to the toroidal-type continuously variable transmission.

Further, the above-mentioned object can also be achieved by a method for assembling a toroidal-type continuously variable transmission, the toroidal-type continuously variable transmission comprising:

an input shaft including a flange portion at its one end portion;

a circular-ring-shaped cam plate supported on the inner surface of the flange portion of the input shaft, the circular-ring-shaped cam plate including, at its inner surface, a drive side cam surface which comprises an uneven surface extending in the circumferential direction of the cam plate;

an input side disk including an outer surface and an inner surface, and the input side disk being supported on the periphery of the input shaft in such a manner that it is allowed not only to shift in the axial direction of the input shaft with respect to the input shaft but also to rotate in synchronization with the input shaft, the outer surface being disposed opposed to the drive side cam surface of the cam plate and formed as a driven side cam surface comprising an uneven surface extending in the circumferential direction of the input side disk, and the inner surface being disposed on the opposite side to the outer surface in the axial direction of the input side disk and formed as a concave-shaped surface having an arc-shaped section;

a plurality of rollers respectively held by and between the drive side cam surface and the driven side cam surface; and a retainer for holding the plurality of rollers in a freely rotatable manner, the assembling method comprising the steps of:

previously assembling the input shaft, the cam plate, the input side disk, the rollers and the retainer which are parts produced separately from one another so as to have such positional relationship that is provided after completion of assembly of the toroidal-type continuously variable transmission, before they are actually assembled to the toroidal-type continuously variable transmission, thereby forming the loading cam device;

measuring thrust to be generated due to the mutual relative rotation between the cam plate and the input side disk of the loading cam device; and, after then, combining the loading cam device for with other component parts of the toroidal-type continuously variable transmission, thereby completing assembly of the toroidal-type continuously variable transmission.

In the above-mentioned method, it is preferable that the previously assembling step further comprises the steps of:

providing on the input shaft an angular-type ball bearing which rotatably supporting the cam plate, in which the angular-type ball bearing comprises an inner race raceway formed on the inner surface of the flange portion, an outer race raceway formed on the inner peripheral edge portion of the outer surface of the cam plate, and a plurality of balls respectively interposed between the inner race raceway and the outer race raceway in a freely rotatable manner.

In addition, in the above-mentioned method, it is also preferable that the previously assemblying step further comprises the steps of:

providing a ball spline between the input shaft and the input side disk.

Further, in the above-mentioned method, it is advantageous that the previously assemblying step further comprises the steps of:

providing a countersunk plate spring between the input shaft and the input side disk in the axial direction of the input shaft so as to apply a pre-load.

Moreover, in the above-mentioned method, it is advantageous that the previously assemblying step further comprises the steps of:

providing a thrust needle roller bearing between the input shaft and the input side disk.

A toroidal-type continuously variable transmission, which is structured in such a manner that it includes the above-structured loading cam device for a toroidal-type continuously variable transmission and its thrust measuring device according to the invention, or a toroidal-type continuously variable transmission manufactured according to the above-mentioned assembling method, based on a similar operation to the previously described conventional toroidal-type continuously variable transmission, transmits a rotation force between the input side and output side disks and further, by changing the inclination angles of the trunnions, changes a rotation speed ratio between these disks.

Especially, in a loading cam device for a toroidal-type continuously variable transmission, an apparatus for measuring the same loading cam device, and a method for assembling a toroidal-type continuously variable transmission according to the invention, the input shaft, camp late, input side disk, rollers, and retainer, which are respectively produced as separate parts, prior to their actual assembly to the toroidal-type continuously variable transmission, have been previously assembled together in such position relationship that should be provided between them after completion of assembly of the present toroidal-type continuously variable transmission. And, the thrust to be generated due to the relative rotation between the cam plate and input side disk has been previously measured. Thanks to this, in case where the thrust to be generated by the loading cam device in accordance with the estimated dimension errors and shape errors of the component parts of the toroidal-type continuously variable transmission deviates greatly from its design value, such deviation can be confirmed before these component parts are assembled into the housing. Therefore, without requiring a troublesome operation to take apart and re-assemble the whole toroidal-type continuously variable transmission, the position relationship between the component parts of the toroidal-type continuously variable transmission can be maintained with high precision to thereby be able to secure the efficiency and durability of the toroidal-type continuously variable transmission.

DETAILED DESCRIPTION OF THE PREFERRED EMBODIMENTS

Figure 1:
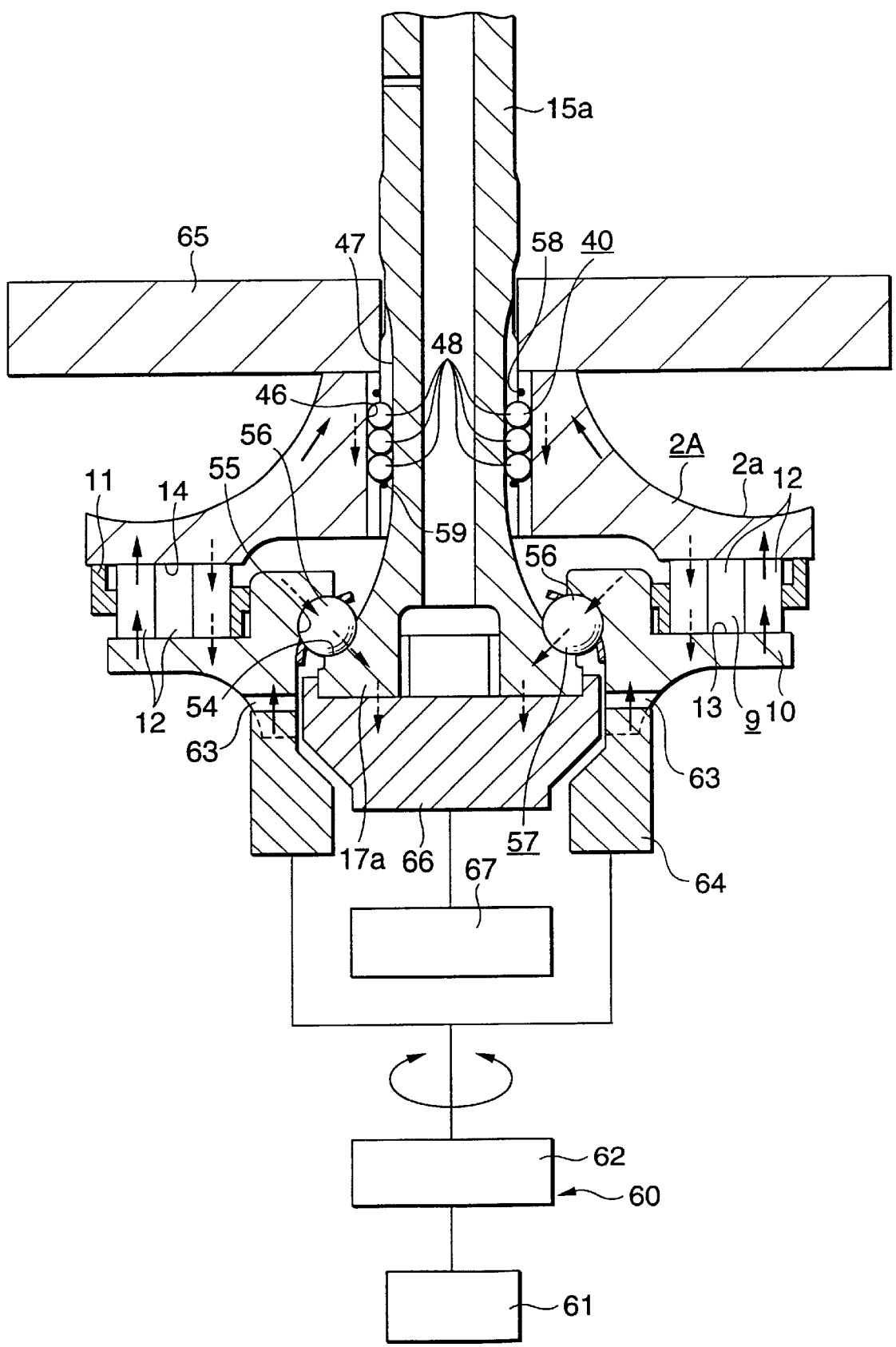
FIG. 1 is a section view of the main portions of a first embodiment of a toroidal-type continuously variable transmission according to the invention, showing a state thereof in which an input shaft and a loading cam device are combined together and thrust to be generated by the loading cam device is measured.
Figure 2:
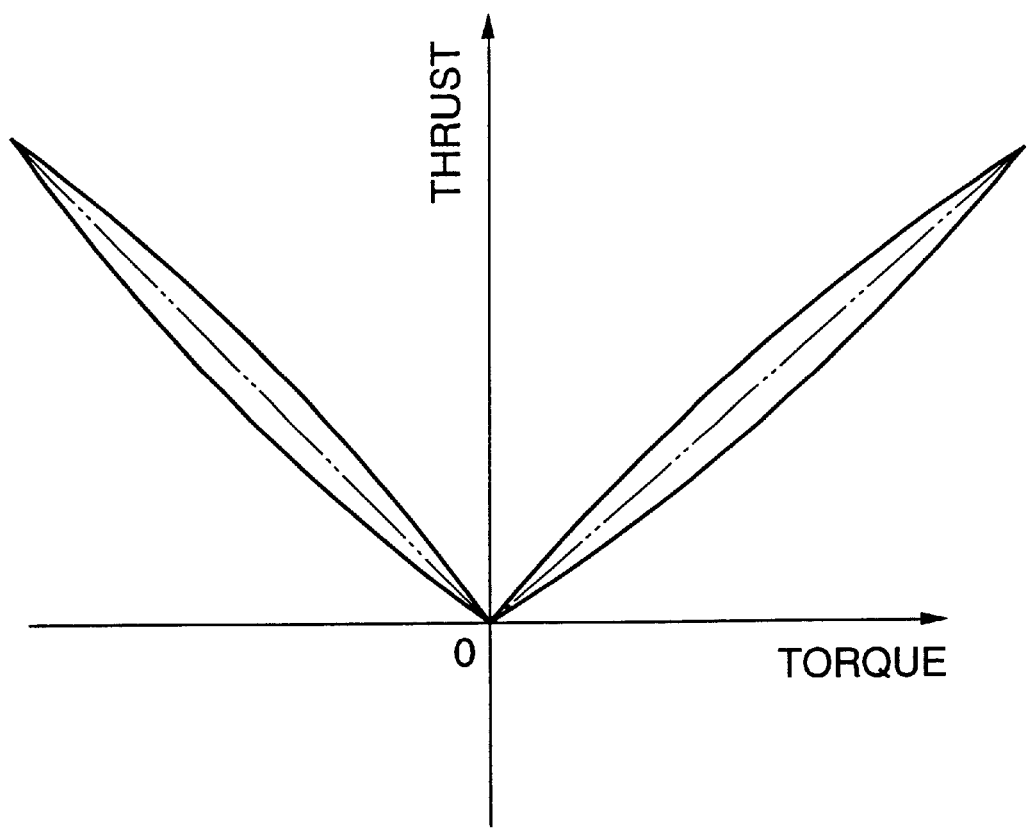
FIG. 2 is a graphical representation of the relationship between torque applied to a cam plate of the loading cam device and thrust generated by the loading cam device in the first embodiment.
Figure 3:
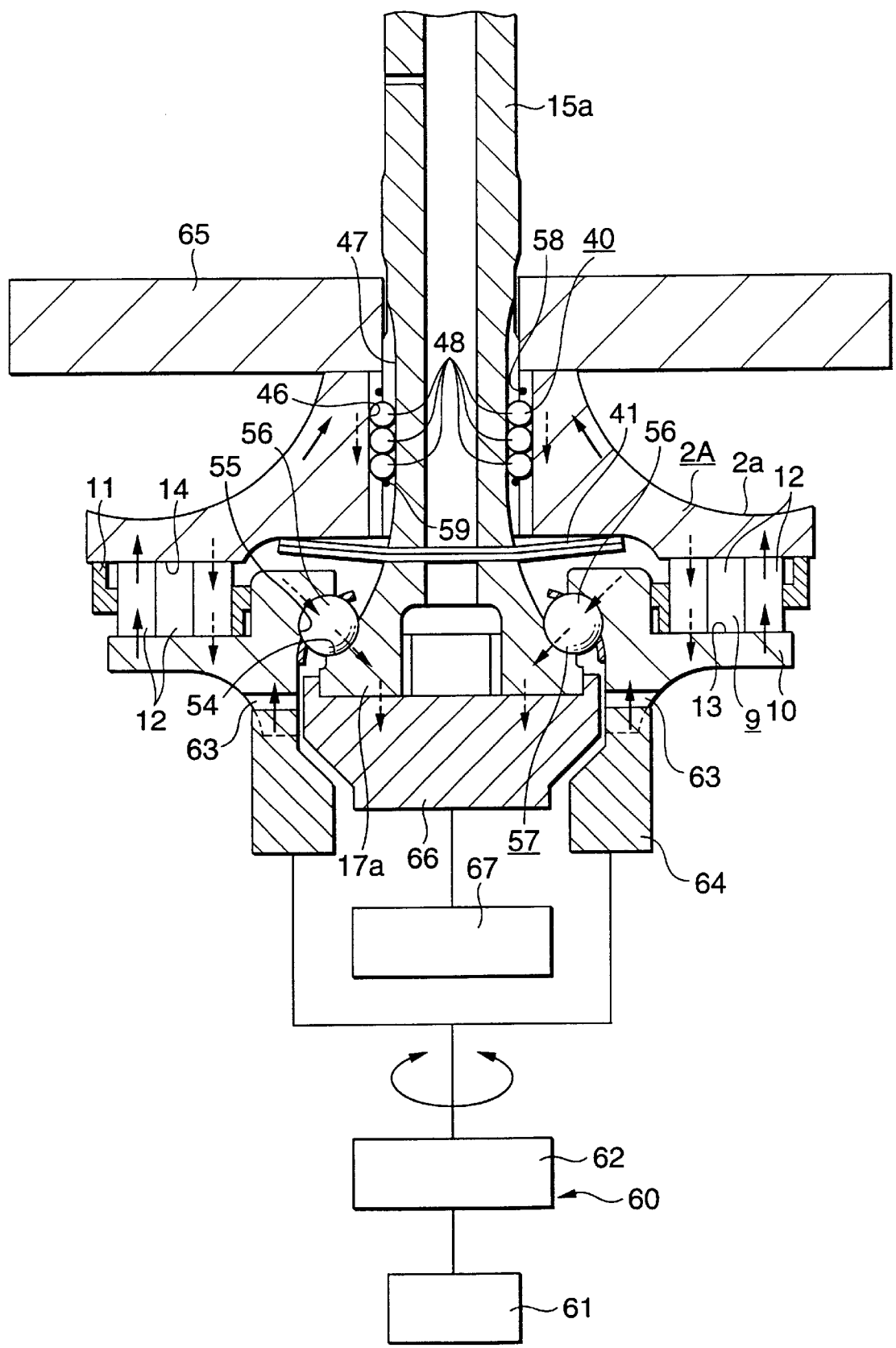
FIG. 3 is, correspondingly to FIG. 1, a section view of a second embodiment of a toroidal-type continuously variable transmission according to the invention.

Now, FIGS. 1 and 2 show a first embodiment of a toroidal-type continuously variable transmission, an apparatus for measuring thrust of the loading cam device for the same, and a method for assembling toroidal-type continuously variable transmission, according to the invention. The present embodiment is characterized in that a structure, which is obtained by assembling an input side disk 2A and a loading cam device 9 to the input shaft 15a of a toroidal-type continuously variable transmission, is formed as a unit to thereby be able to previously measure the thrust that is generated by the loading cam device 9. The structures and operations of the remaining portions of the present embodiment are similar to those of the previously described conventional structure and thus the duplicate illustration and description thereof are omitted or simplified. In the following description, the characteristic portion of the present embodiment will be discussed mainly.

To one end portion (in FIG. 1, the lower end portion) of the input shaft 15a, there is fixed a flange portion 17a and, in the inner surface of the flange portion 17a which is a surface near to the intermediate portion of the input shaft 15a, there is formed an inner race raceway 54 of an angular type. Also, in the inner peripheral edge portion of a circular-ring-shaped cam plate 10 with its inner surface formed as a drive-side cam surface 13 extending unevenly in the circumferential direction of the cam plate 10, there is formed an outer race raceway 55 of an angular type. And, between the outer race raceway 55 and inner race raceway 54, there are rollably interposed a plurality of balls 56, 56 to thereby form a ball bearing 57 of an angular type which is a rolling bearing, whereby the cam plate 10 is supported on the inner surface of the flange portion 17a in such a manner that it can be rotated with respect to the input shaft 15a.

The input side disk 2A is supported through a ball spline 40 on the periphery of the near-to-one-end portion of the intermediate portion of the input shaft 15a. Therefore, the input side disk 2A is supported on the input shaft 15a in such a manner that it is allowed not only to shift in the axial direction of the input shaft 15a but also to rotate in synchronization with the input shaft 15a. By the way, in order to be able to prevent balls 48, 48 forming the ball spline 40 from slipping off, a disk side retaining ring 58 is secured to the near-to-inner-end (in FIG. 1, the near-to-upper-end) portion of an inside diameter side ball spline groove 46 formed in the inner peripheral surface of the input side disk 2A, and a shaft side retaining ring 59 is secured to the near-to-outer-end (in FIG. 1, the near-to-lower-end) portion of an outside diameter side ball spline groove 47 formed in the outer peripheral surface of the input shaft 15a, respectively. That is, the balls 48, 48 are prevented against removal or slippage from the ball spline grooves 46, 47 by these retaining rings 58, 59.

Also, of the two inner and outer surfaces of the input side disk 2A, the outer surface disposed opposed to the drive side cam surface 13 is formed as a driven side cam surface 14 which extends unevenly in the circumferential direction of the input side disk 2A. On the other hand, the inner surface 2a of the input side disk 2A, which is disposed on the opposite side to the driven side cam surface 14 in the axial direction of the input side disk 2A, is formed as a concave-shaped surface having an arc-shaped section. Also, between the drive side cam surface 13 and driven side cam surface 14, there are interposed a plurality of rollers 12, 12, in order to be able to form the loading cam device 9. Also, the respective rollers 12, 12 are rollably held by a retainer 11 the whole of which is formed so as to have a circular ring shape.

In order to measure the thrust that is generated by the above-structured loading cam device 9, there is disposed a drive member 60 which is used to drive and rotate the cam plate 10. The drive member 60 comprises an electric motor 61 which is able not only to control the torque to be applied to the cam plate 10 but also to switch the rotation direction of the cam plate 10, and a transmission ring 64 which can be engaged with projecting pieces 63, 63 provided on the back surface (in FIG. 1, the lower surface) of the cam plate 10 to thereby transmit the output of the electric motor 61 to the cam plate 10. The output torque of the electric motor 61 can be measured by a torque sensor 62. Also, the inner end face (in FIG. 1, the upper end face) of the input side disk 2A is butted against a fixed jig 65 to thereby prevent the input side disk 2A from shifting in a direction where it goes apart from the cam plate 10. Further, a jig 66 is fitted with the base end face (in FIG. 1, the lower surface) of the input shaft 15a, while a thrust load applied to the jig 66 can be detected by a load cell 67 which consists of a sensor. Thanks to this structure, a thrust load applied to the input side disk 2A can be detected. By the way, on the contrary to the illustrated case, the end face of the input shaft 15a may be butted against a fixed jig and the inner end face of the input side disk 2A may be butted against a movable jig, so that the thrust load applied to the input side disk 2A can also be measured by a sensor such as a load cell, which is engaged with this movable jig.

To measure the thrust to be generated from the loading cam device 9 using the above-structured thrust measuring device, the electric motor 61 is electrically energized to thereby rotate the cam plate 10 through the transmission ring 64. In this operation, by controlling the amount of energizing electricity to be applied to the electric motor 61 and the direction of such energization, the intensity of the torque to be applied to the cam plate 10 is varied gradually as well as the direction of the torque is switched. Based on the rotation of the cam plate 10, the input side disk 2A is pressed against the fixed jig 65 by the loading cam device 9 in such a manner as shown by a solid arrow line in FIG. 1. And, as a reaction to this pressing force, the cam plate 10 and input shaft 15a, as shown by broken arrow lines in FIG. 1, tend to shift in a direction where they go away from the fixed jig 65, so that the base end face of the input shaft 15a is pressed against the load cell 67 through the jig 66. In this manner, the intensity of the force with which the base end face of the input shaft 15a presses against the load cell 67 can be controlled so as to correspond to the thrust that is generated by the loading cam device 9.

Therefore, connection of the detect value of the torque sensor 62 with the detect value of the load cell 67 can tell the characteristic of the thrust to be generated by the loading cam device 9. Now, FIG. 2 shows an example of the characteristic of the thrust to be generated by the loading cam device 9. In FIG. 2, a chained line shows the theoretical value of the relationship between the input torque applied to the loading cam device 9 and the thrust generated by the loading cam device 9 and, on the other hand, a solid line shows a value which is actually measured. The deviation of the measured value from the theoretical value is based on the well-known hysteresis and thus it is impossible to avoid such deviation completely.

Figure 15:
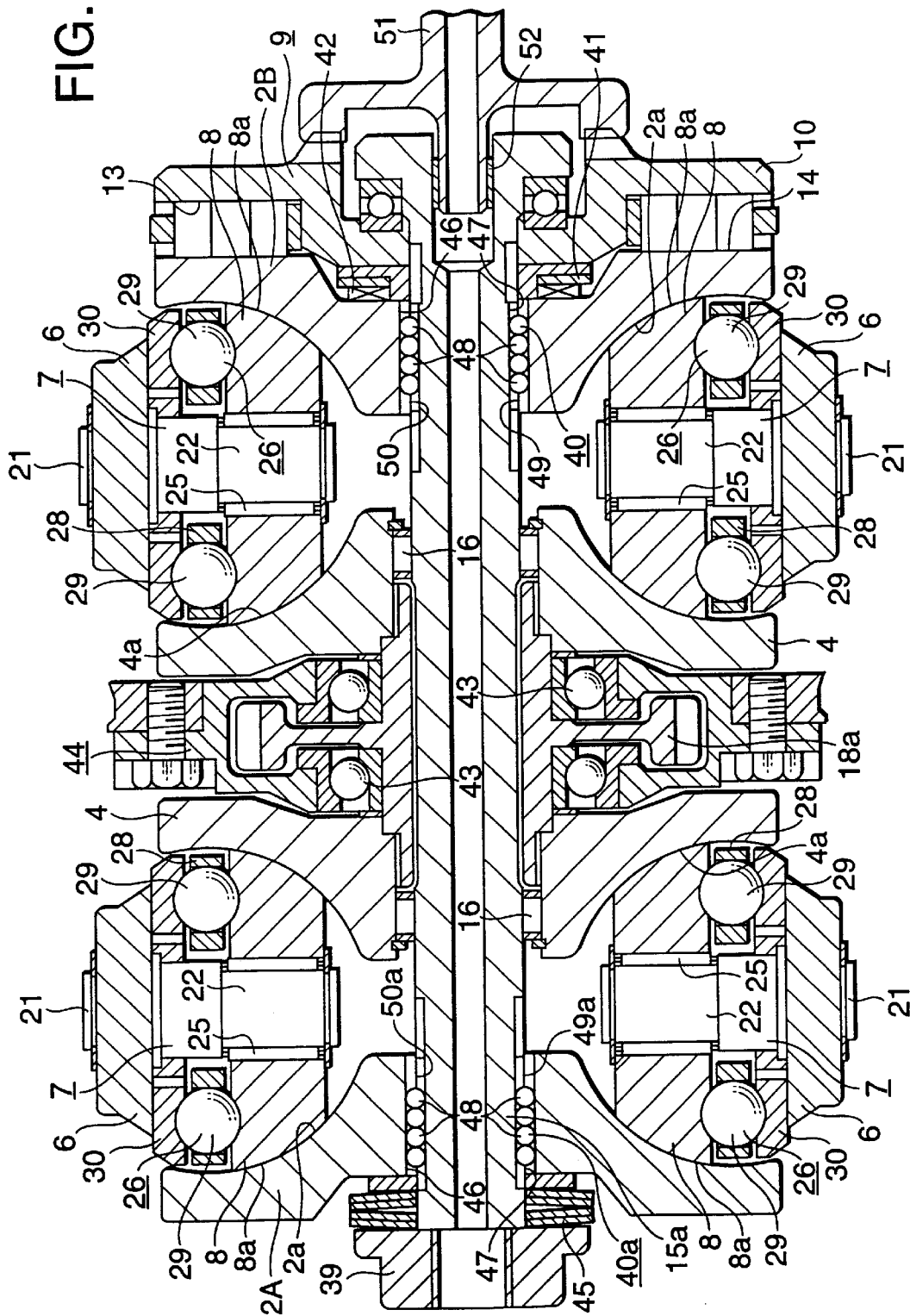
FIG. 15 is a section view of a second example of a conventional concrete structure of a toroidal-type continuously variable transmission.
Figure 16:
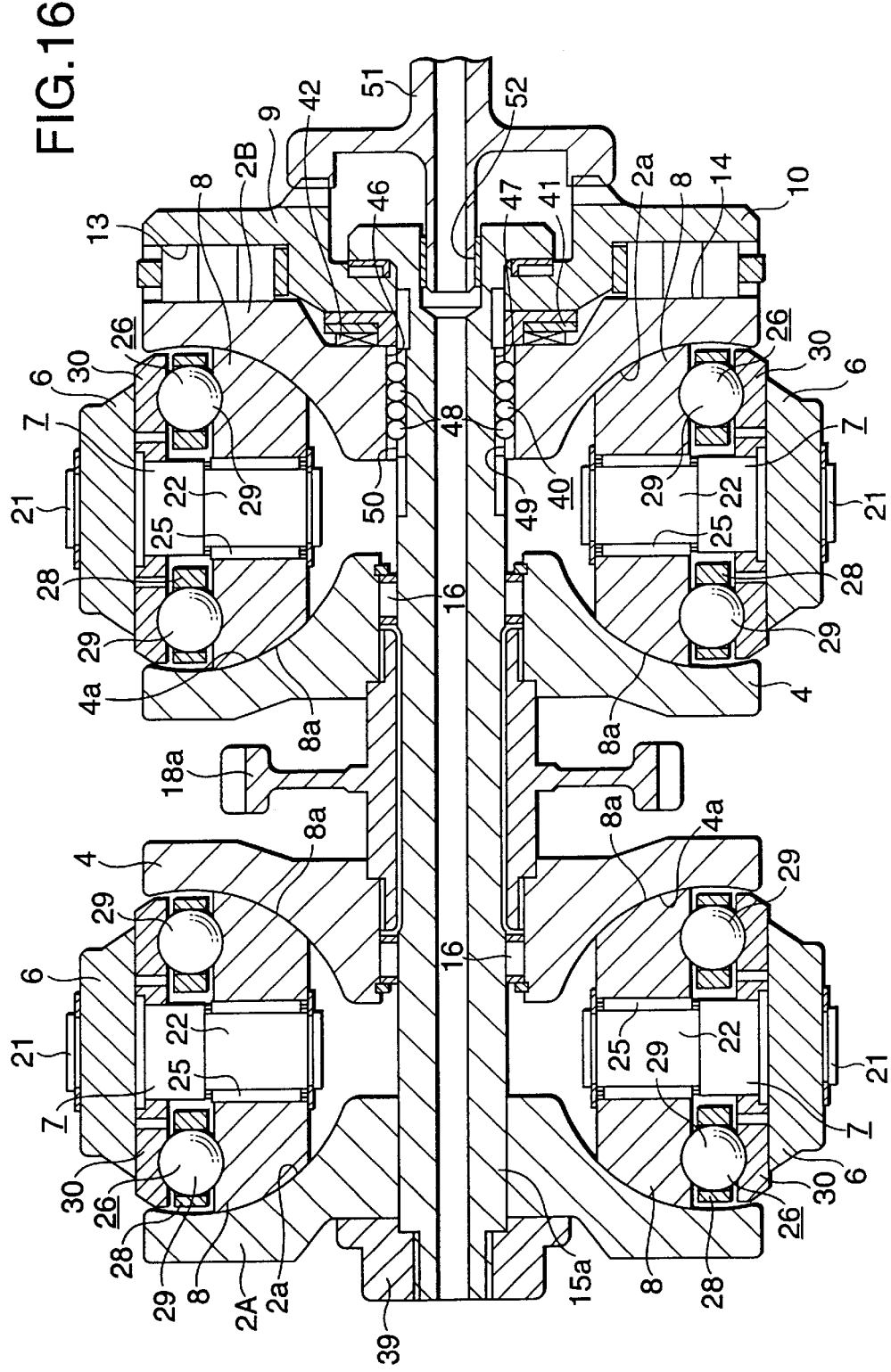
FIG. 16 is a section view of a third example of a conventional concrete structure of a toroidal-type continuously variable transmission.

In case where the thrust generated by the loading cam device 9 is measured in this manner and, as a result of this, the performance of the loading cam device 9 is found to be an expected performance (that is, between the measured value and design value, there is not found such deviation that can raise a problem), as shown in FIGS. 15 and 16, other component parts such as the output side disks 4, 4, output gear 18a, and the other input side disk 2A are assembled to the periphery of the input shaft 15a. Also, still another component parts such as the trunnions 6, 6 and power rollers 8, 8 are further combined together with them, thereby being able to produce a toroidal-type continuously variable transmission, for example, as shown in FIGS. 15 and 16.

Figure 14:
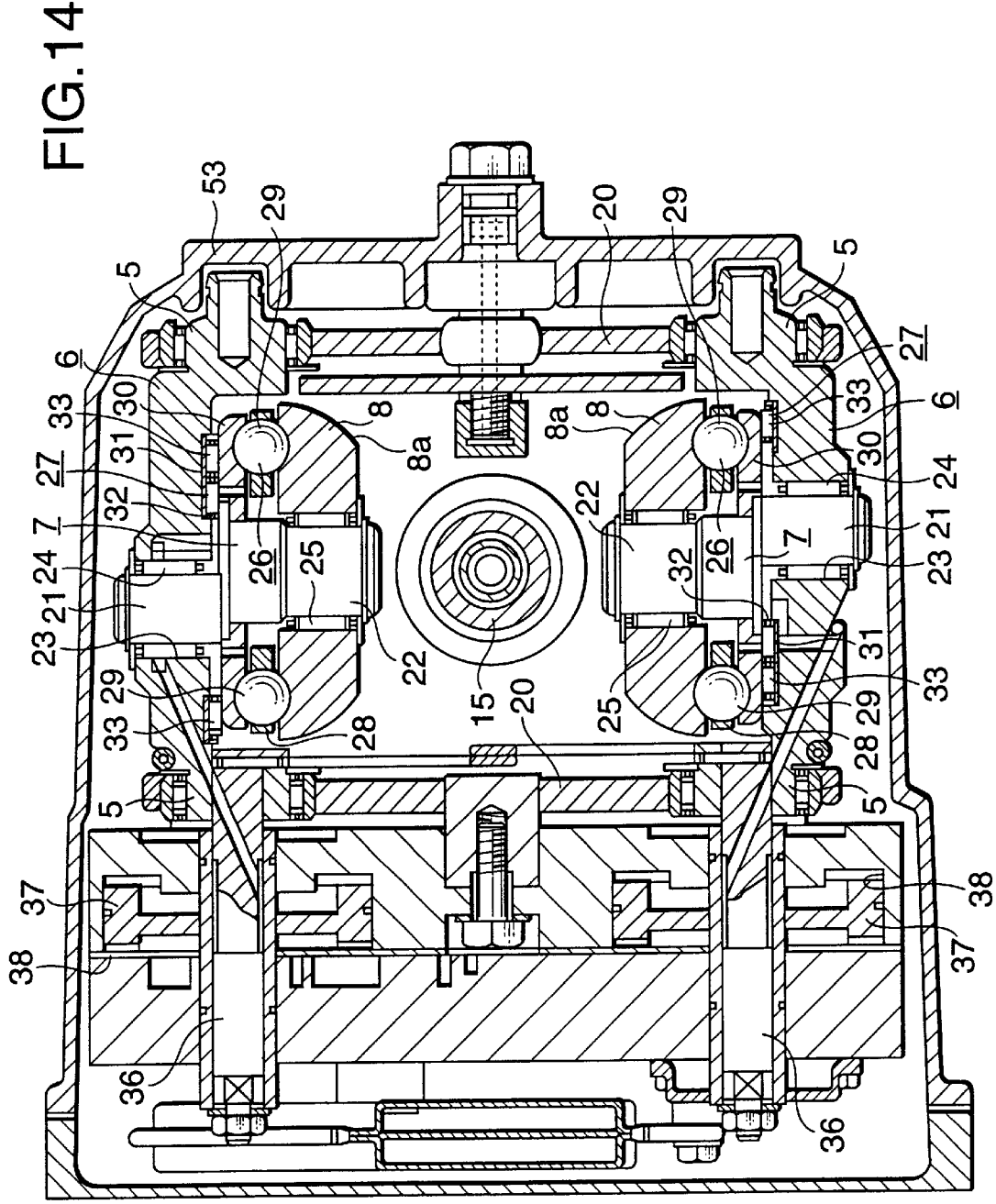
FIG. 14 is a section view taken along the arrow mark I—I shown in FIG. 13.

As described above, according to the present embodiment, the thrust to be generated by the loading cam device 9 based on the estimated dimension errors and shape errors of the component parts of the toroidal-type continuously variable transmission deviates greatly from its design value, such deviation can be confirmed before these component parts are assembled into the housing 53 (FIG. 14). Therefore, without requiring a troublesome operation to disassemble and re-assemble the whole toroidal-type continuously variable transmission, the required relationship between the component parts the toroidal-type continuously variable transmission can be maintained with high precision to thereby be able to secure the efficiency and durability of the toroidal-type continuously variable transmission.

Figure 4:
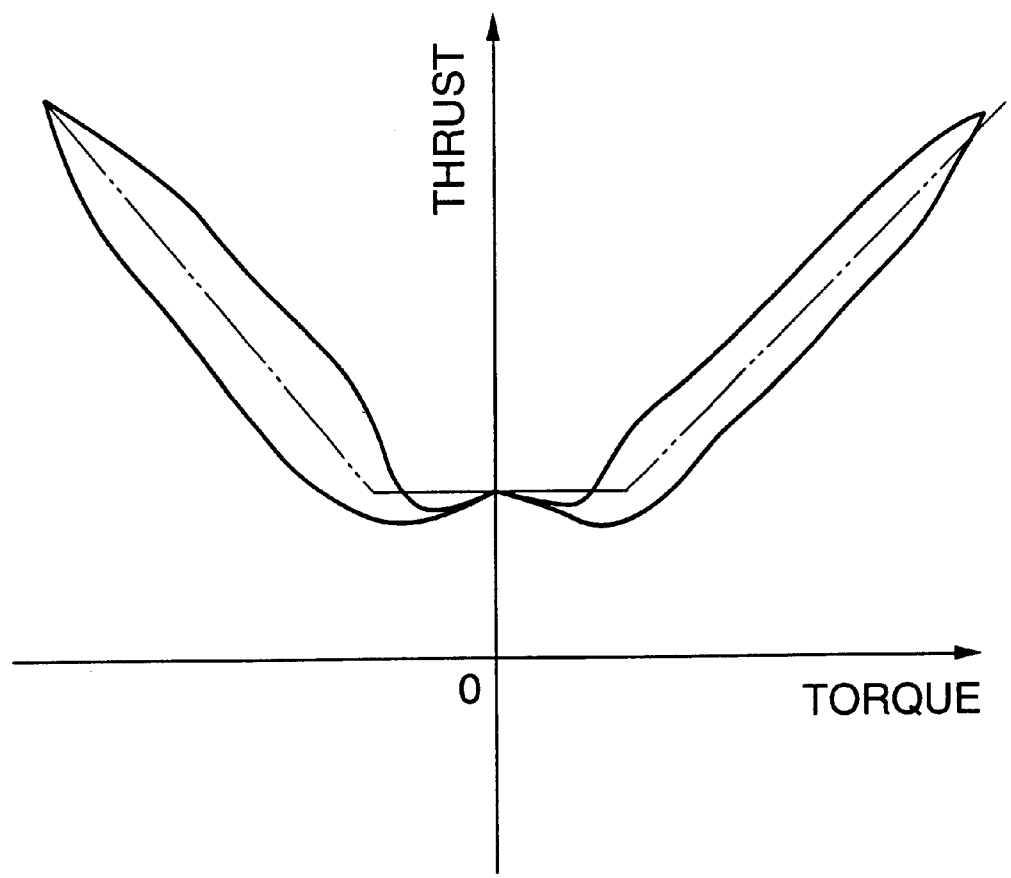
FIG. 4 is, correspondingly to FIG. 2, a graphical representation of the relationship between the torque and thrust in the second embodiment.

Next, FIGS. 3 to 7 respectively show a second embodiment of a toroidal-type continuously variable transmission,
an apparatus for measuring thrust of the loading cam device for the same, and a method for assembling toroidal-type continuously variable transmission, according to the invention. In the present embodiment, between an input shaft 15a and an input side disk 2A, there is interposed a countersunk plate spring 41 used to apply a pre-load in such a manner that it is connected in parallel to a loading cam device 9. Therefore, when the loading cam device 9 is not in operation and thus even when the loading cam device 9 is not generating thrust, a thrust load corresponding to the elasticity of the countersunk plate spring 41 is applied to the input side disk 2A. Accordingly, in the present embodiment, the thrust load to be applied to the input side disk 2A is as shown in FIG. 4. In FIG. 4, a chained line points out theoretical values, whereas a solid line expresses the values that are measured by a load cell 67.

Figure 5:
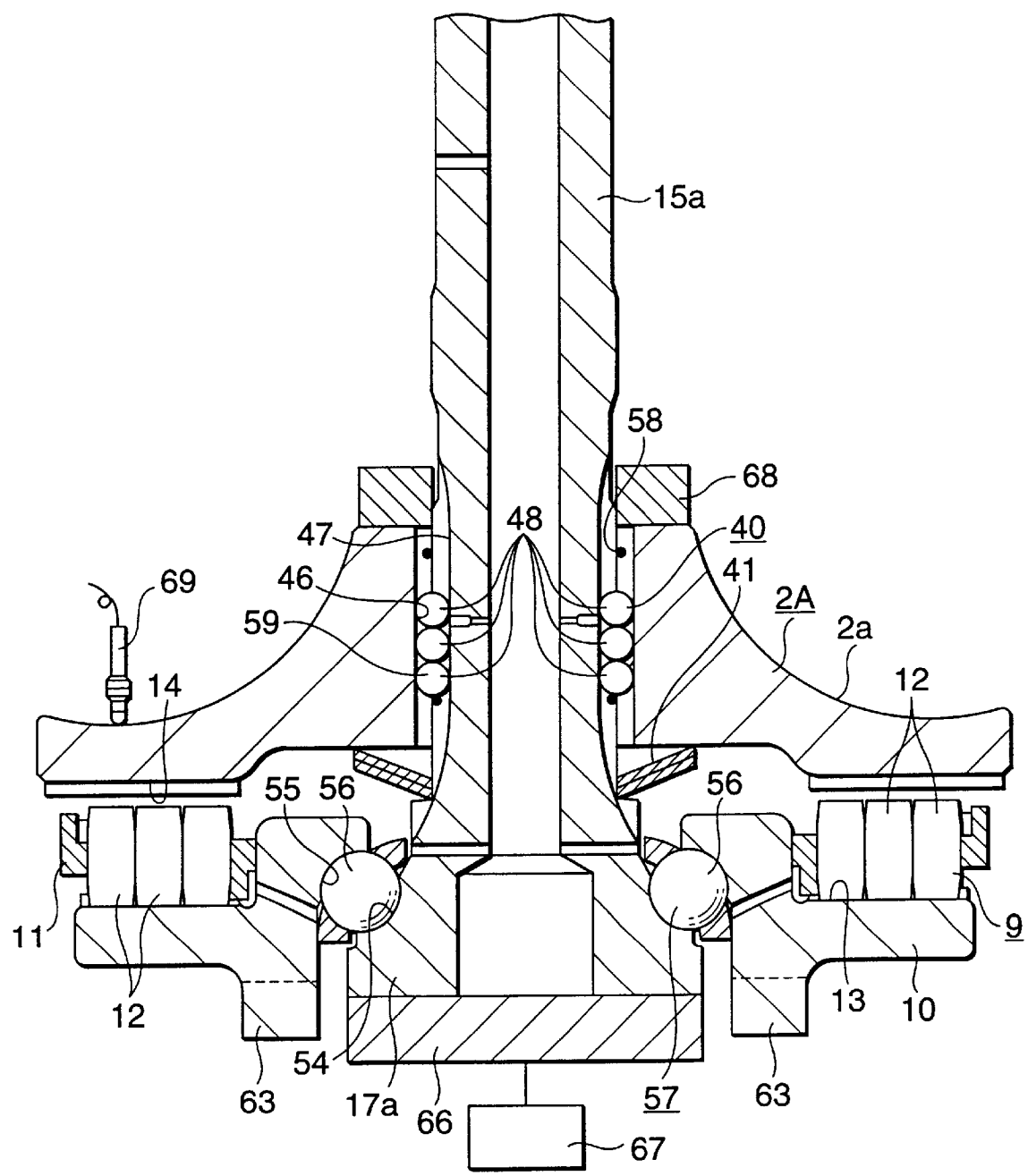
FIG. 5 is a section view of the main portions of the structure of the second embodiment, showing an initial condition thereof when measuring variations in the elasticity of a countersunk spring for pre-loading caused in accordance with the shift of the bottom portion of the inner surface of an input side disk.
Figure 6:
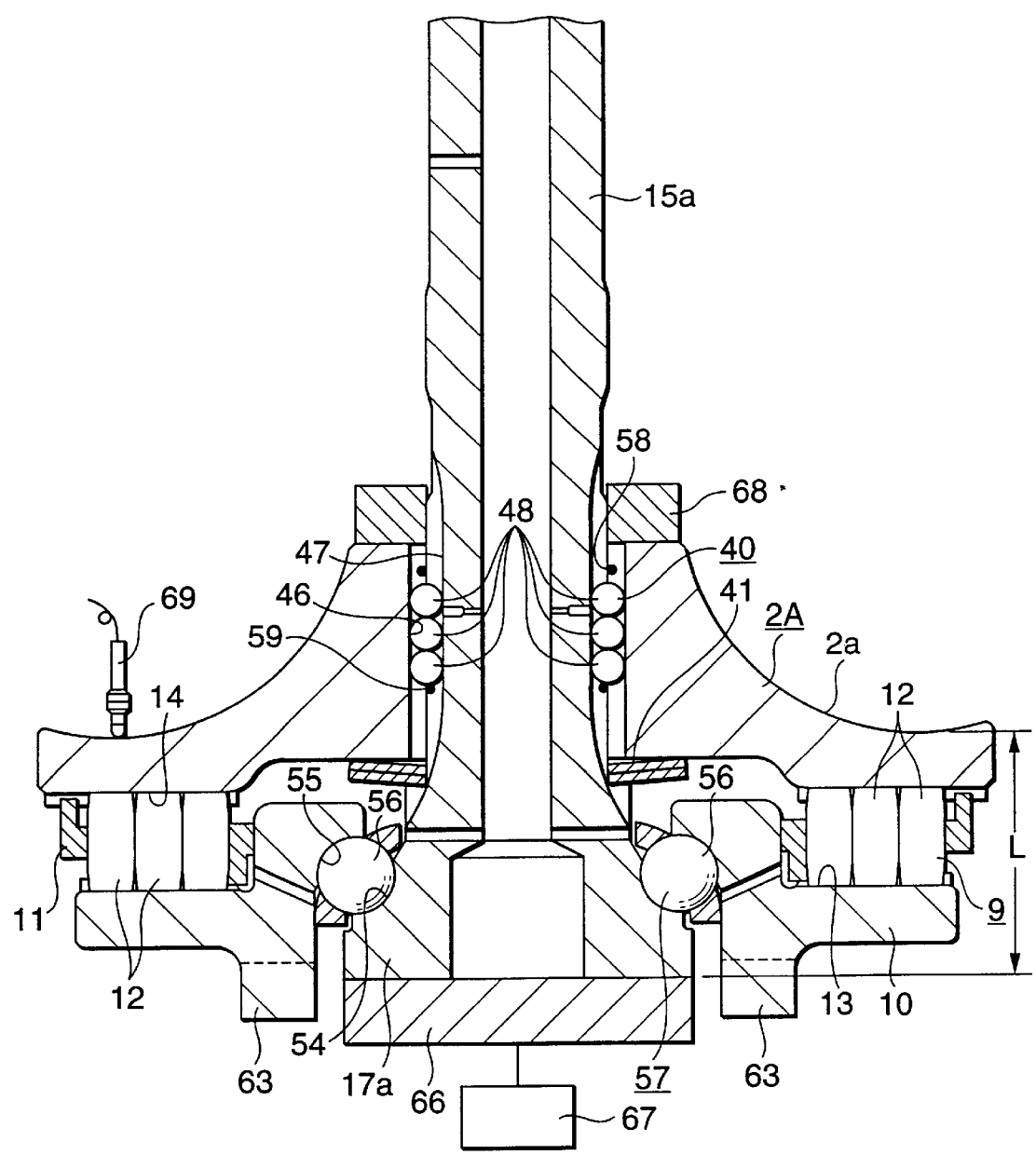
FIG. 6 is a section view of the main portions of the structure of the second embodiment, showing a final condition thereof in the above measuring.

By the way, when there is disposed the countersunk plate spring 41 in this manner, in order for the toroidal-type continuously variable transmission to be able to fulfill its performance, it is important that the elasticity of the countersunk plate spring 41 is set for a proper value in a state where it is assembled between the input shaft 15a and input side disk 2A. Thus, as shown in FIGS. 5 and 6, the elasticity of the countersunk spring plate 41 is measured in a state where it is assembled between the input shaft 15a and input side disk 2A. That is, at firsts, from such a state as shown in FIG. 5 in which the countersunk plate spring 41 is free, the input side disk 2A is pressed toward a cam plate 10 by a pressing jig 68. And, while the shift amount of the input side disk 2A is being measured by a shift sensor 69, a thrust load applied to the input shaft 15a is measured by the load cell 67. By the way, the shift sensor 69 measures the shift amount of the groove bottom portion of the inner surface 2a of the input side disk 2A that is the smallest in thickness.

Figure 7:
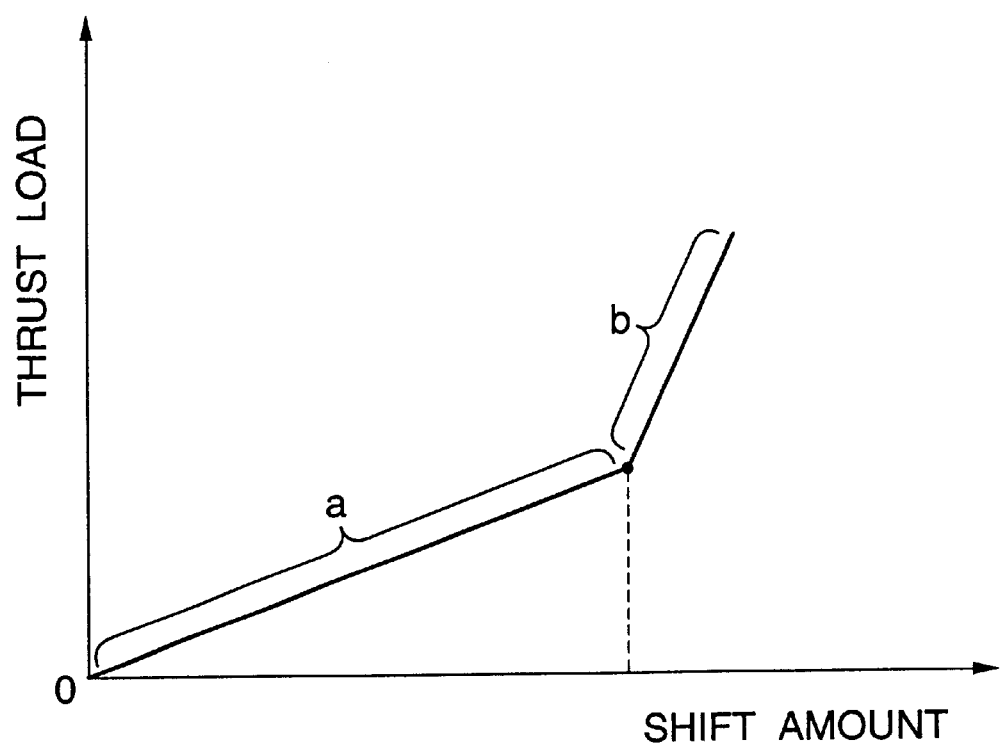
FIG. 7 is a graphical representation of the relationship between the shift amount of the bottom portion of the inner surface of the input side disk and the elasticity of the countersunk spring for pre-loading.

The pressing operation by the pressing jig 68 is carried out until rollers 12, 12 forming the loading cam device 9 move to and beyond their contact conditions with the bottom portions of a drive side cam surface 13 and a driven side cam surface 14 (that is, until a little longer time after they are contacted with the bottom portions). Due to the above measuring operation, the relationship between the shift amount of the input side disk 2A (the measured value by the shift sensor 69) and the thrust load applied to the input shaft 15a (the measured value by the load cell 67) can be obtained as shown in FIG. 7. Of the relationship between the shift amount and thrust load shown in FIG. 7, a range a shows an area in which the elasticity of the countersunk plate spring 41 varies, whereas a range b shows an area in which, after the rollers 12, 12 are contacted with the bottom portions of the drive side cam surface 13 and driven side cam surface 14, the input side disk 2A are elastically deformed. Therefore, when the loading cam device 9 is not in operation, the dimensions of the respective parts are regulated in such a manner that the elasticity of the countersunk plate spring 41 can be set in the range a. Also, from the position of a boundary point (a point of transition) between the ranges a and b, there can be found a distance L between the groove bottom of the inner surface 2a and the base end face of the input shaft 15a. Except for provision of the countersunk plate spring 41, the second embodiment is similar to the previously described first embodiment and thus the duplicate description thereof is omitted here.

Figure 8:
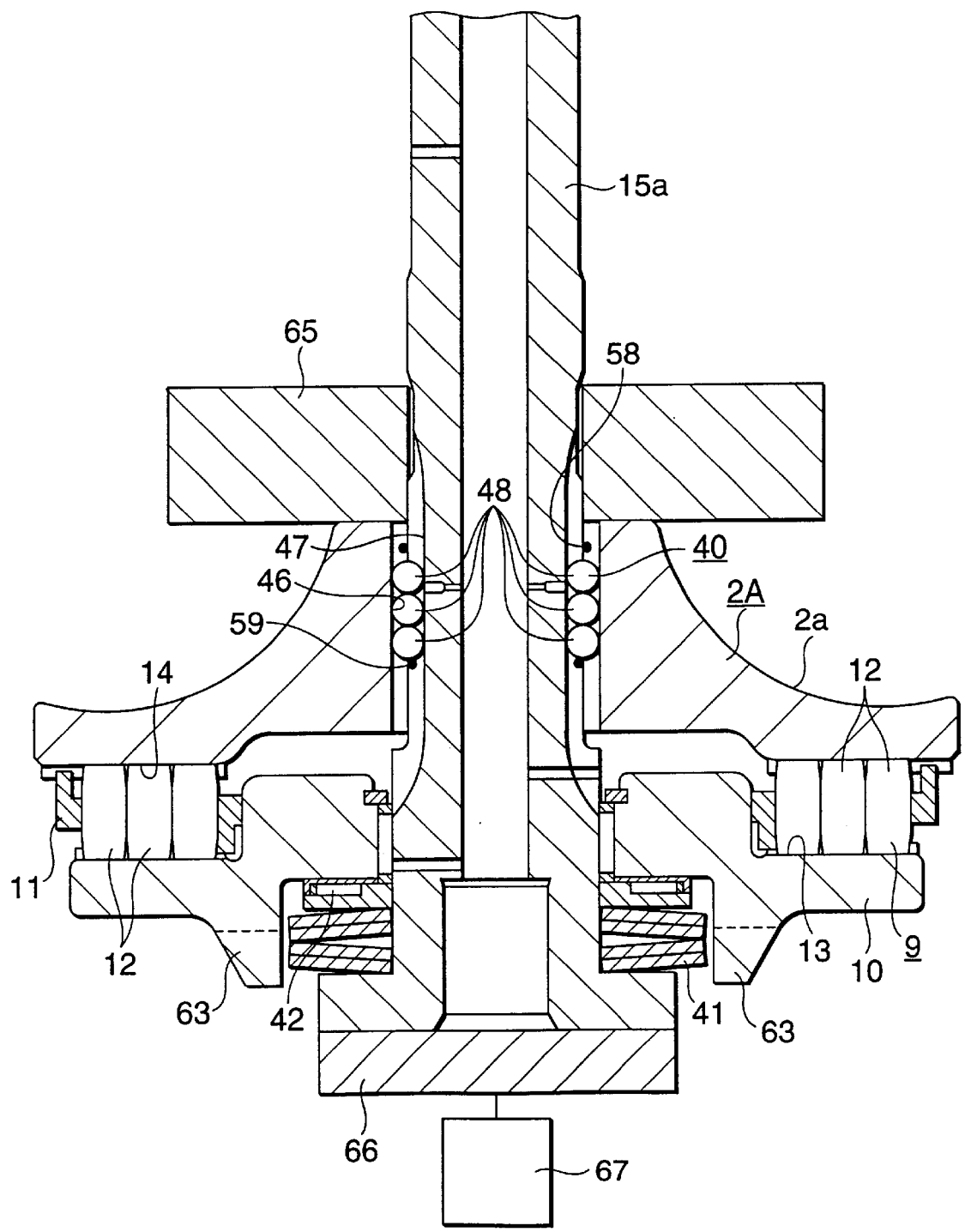
FIG. 8, correspondingly to FIG. 1, a section view of a third embodiment of a toroidal-type continuously variable transmission according to the invention.
Figure 9:
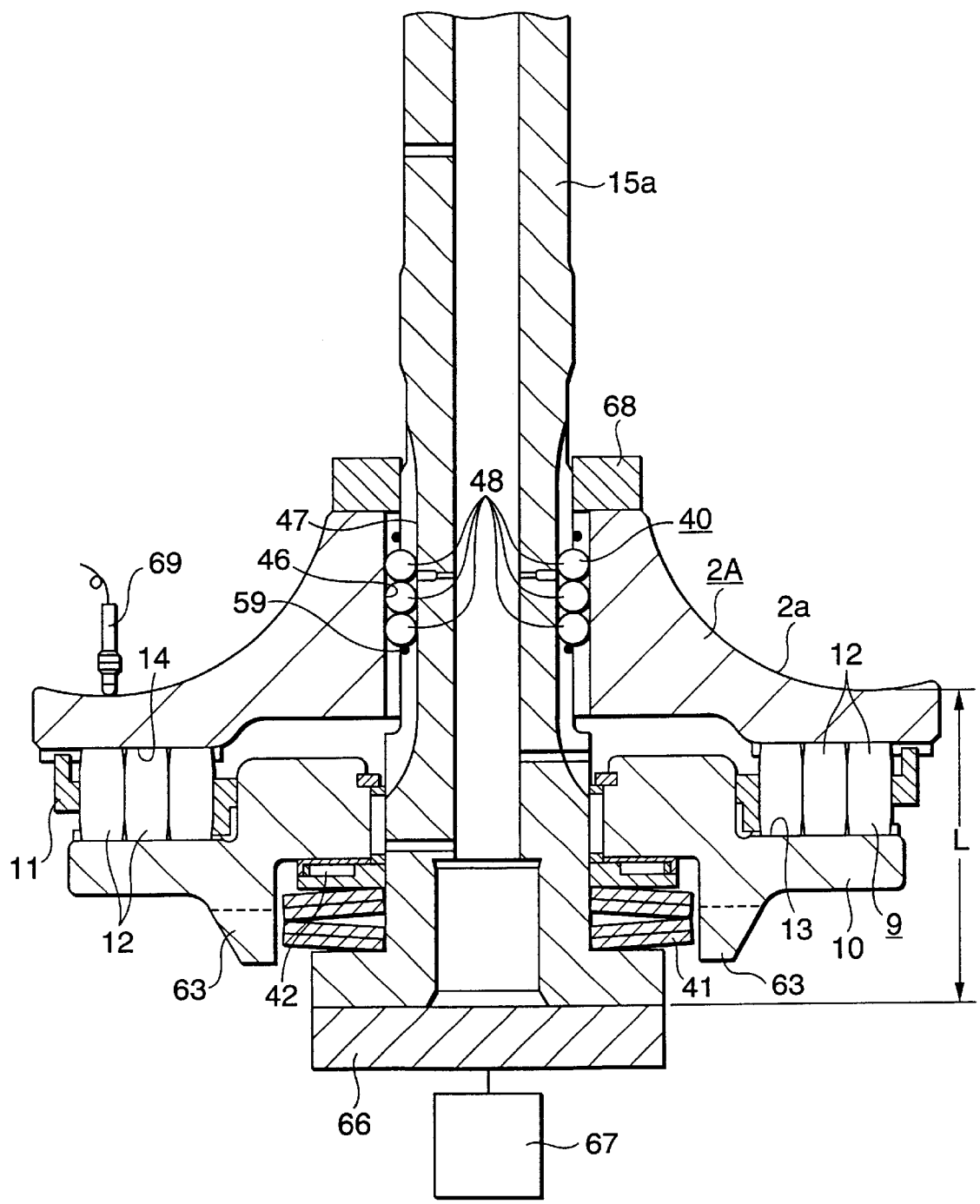
FIG. 9 is a section view of the main portions of the structure of the third embodiment, showing a state thereof when measuring variations in the elasticity of a countersunk plate spring for pre-loading caused in accordance with the shift of the bottom portion of the inner surface of an input side disk.
Figure 10:
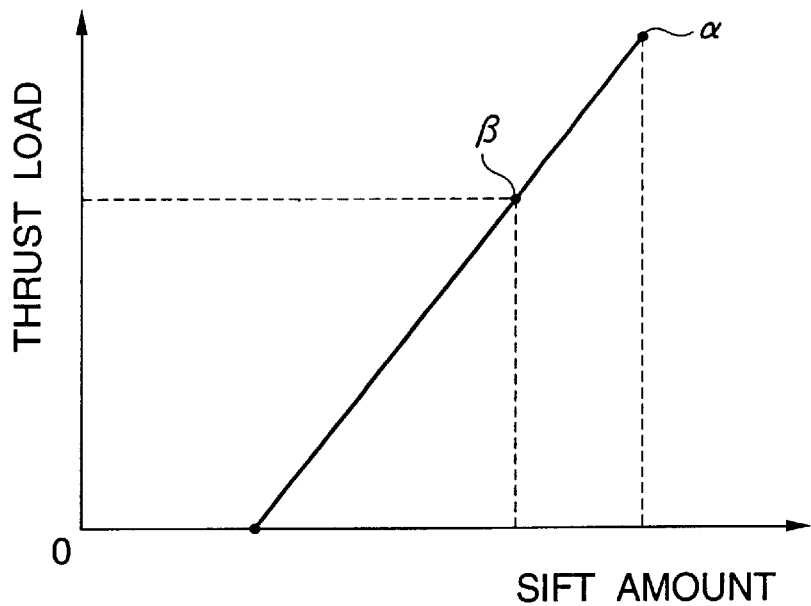
FIG. 10 is a graphical representation of the relationship between the shift amount of the bottom portion of the inner surface of the input side disk and the elasticity of the countersunk plate spring for pre-loading in the third embodiment.
Figure 11:
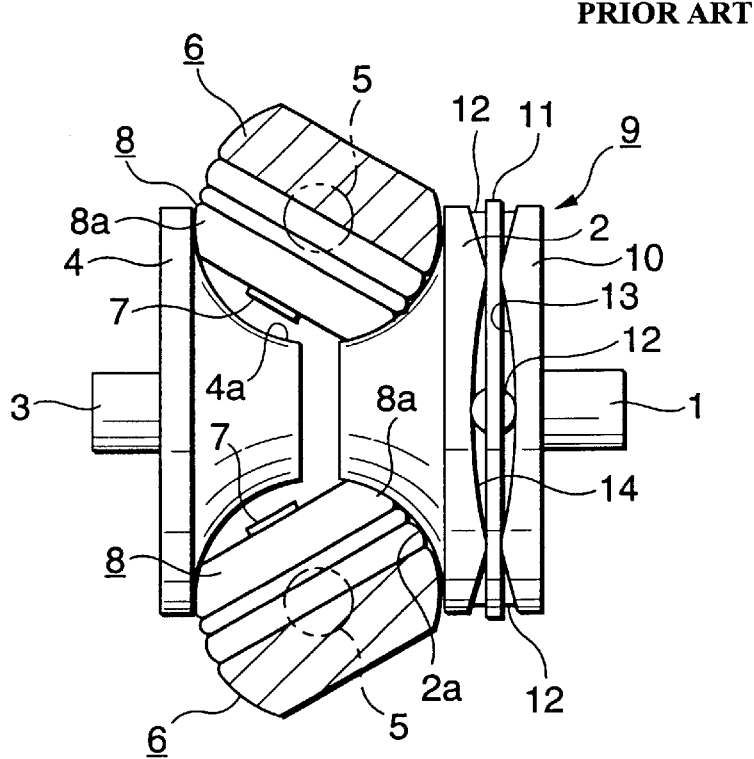
FIG. 11 is a side view of the basic structure of a conventionally known toroidal-type continuously variable transmission, showing a state thereof in which it is set in the maximum deceleration mode.
Figure 12:
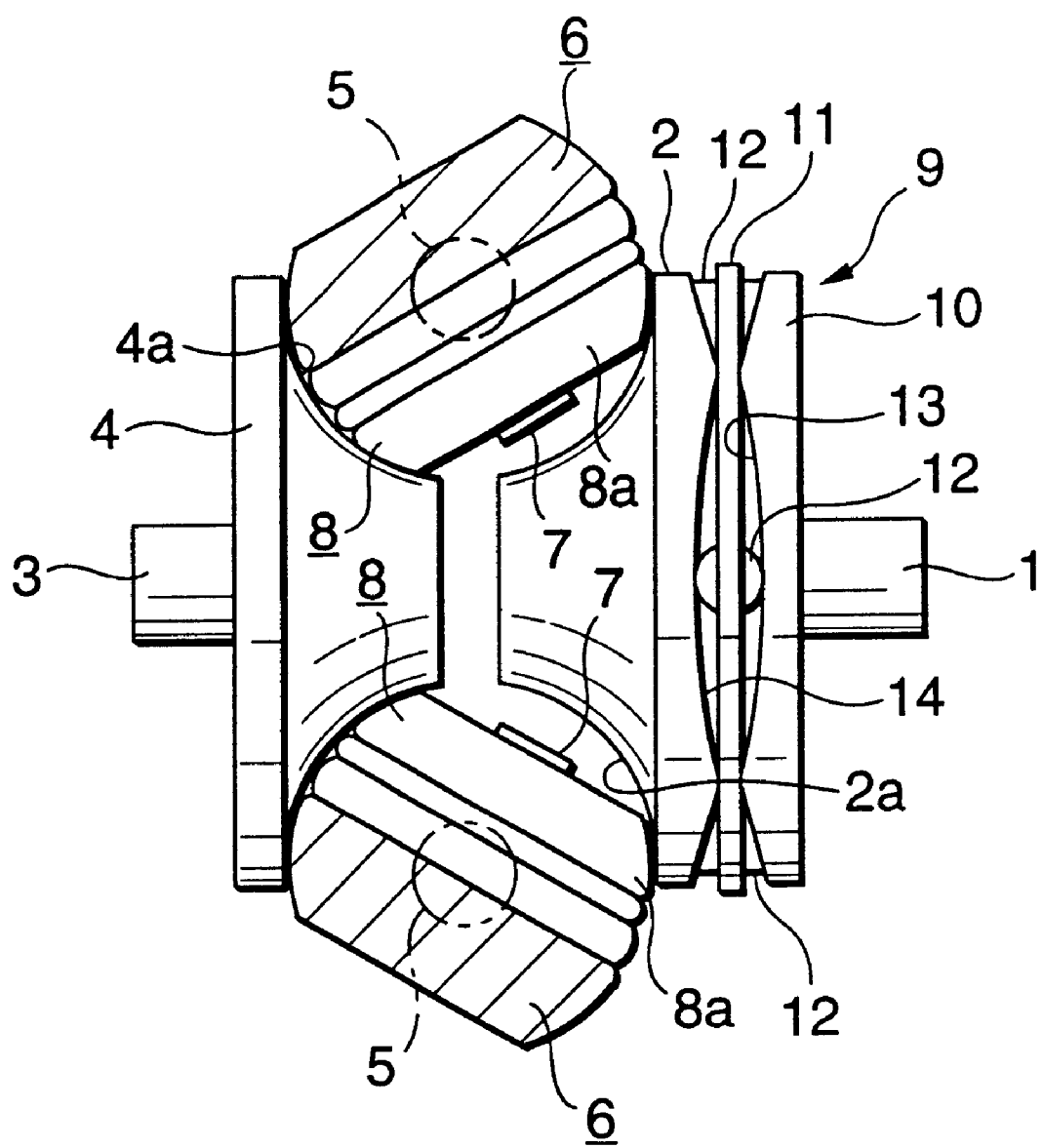
FIG. 12 is a side view of the above conventional toroidal-type continuously variable transmission, showing a state thereof in which it is set in the maximum acceleration mode.
Figure 13:
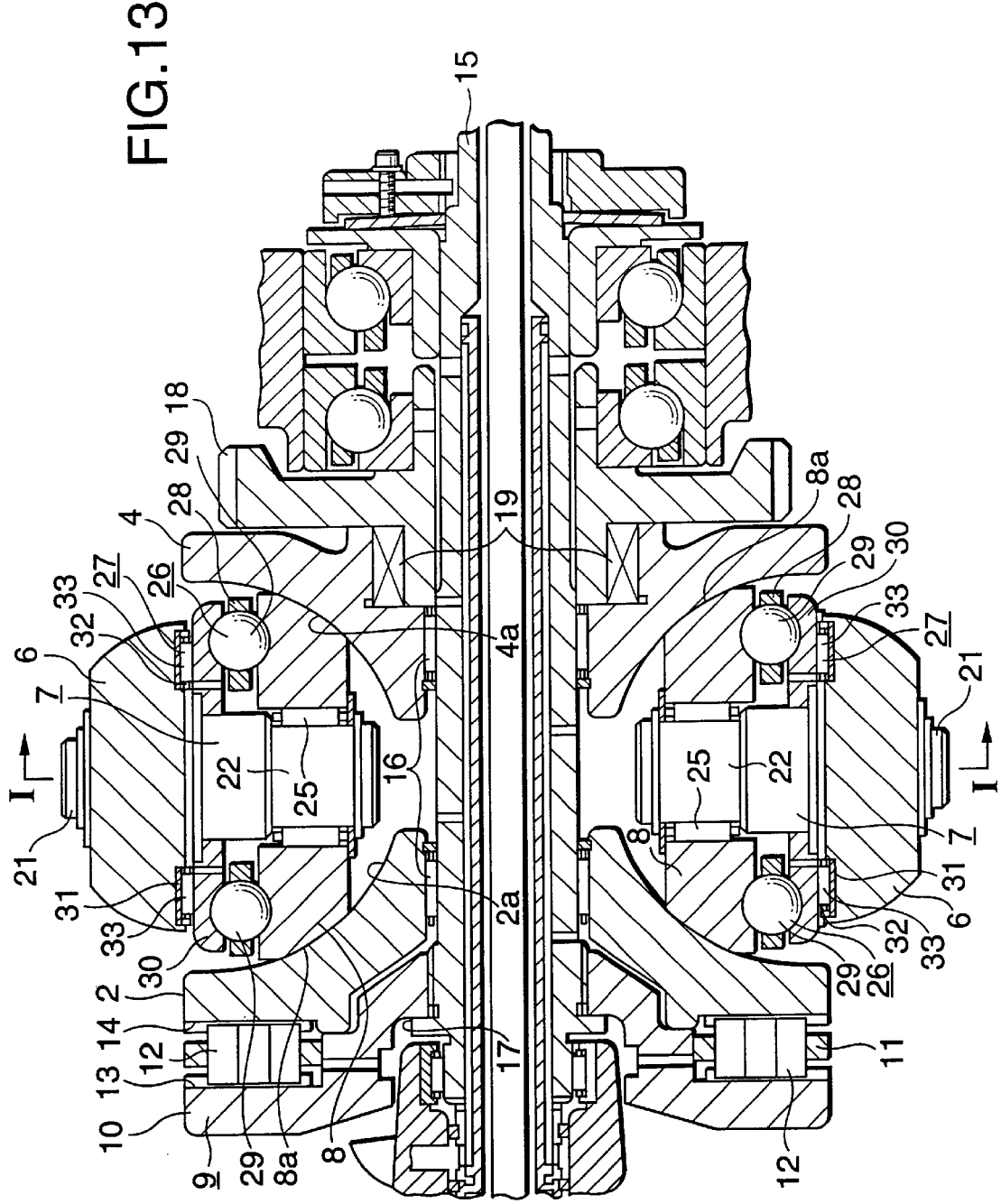
FIG. 13 is a section view of a first example of a conventional concrete structure of a toroidal-type continuously variable transmission.

Next, FIGS. 8 to 10 respectively show a third embodiment of a toroidal-type continuously variable transmission according to the invention. In the present embodiment, between an input shaft 15a and an input side disk 2A, there are interposed a countersunk plate spring 41 used to apply a pre-load and a thrust needle roller bearing 42 in such a manner that they are connected in series to a loading cam device 9. In the present embodiment as well, when measuring the thrust that is generated by the loading cam device 9, as shown in FIG. 8, while the inner end face of the input side disk 2A is butted against a fixed jig 65, a cam plate 10 is driven or rotated and a thrust load applied to the base end face (in FIG. 8, the lower end face) of the input shaft 15a is measured by a load cell 67.

Also, when measuring the elasticity of the countersunk plate spring 41 in a state where it is assembled between the input shaft 15a and input side disk 2A, as shown in FIG. 9, while the inner end face of the input side disk 2A is being pressed toward the cam plate 10 by a pressing jig 68, a thrust load applied to the base end face (in FIG. 8, the lower end face) of the input shaft 15a is measured by the load cell 67. At the same time, the shift amount of the groove bottom portion of the inner surface 2a of the input side disk 2A is measured by a shift sensor 69. Due to this operation, there can be obtained such relationship as shown in FIG. 10 between the shift amount of the groove bottom portion and the thrust load. By the way, in FIG. 10, a range, where the load does not rise regardless of the shift of the groove bottom portion (the input shaft 15a is free from the load), is a range where rollers 12, 12 forming the loading cam device 9 are moving toward the bottom portions of drive side and driven side cam surfaces 13 and 14. Also, a point α is a point where the countersunk plate spring 41 is compressed to the full. In the assembled state of the toroidal-type continuously variable transmission, the thrust load based on the countersunk plate spring 41 is set for a value which corresponds to a point β lower than the point α. Then, there is obtained a load when a distance L from the groove bottom of the inner surface 2a of the input side disk 2A to the base end face of the input shaft 15a provides a given value, and it is checked whether this load is within a specified range or not. The remaining structures and operations of the present embodiment are similar to those of the previously described first embodiment and thus the duplicate description thereof is omitted here.

Since a loading cam device for a toroidal-type continuously variable transmission, a thrust measuring device for measuring the thrust of such loading cam device, and a method for assembling a toroidal-type continuously variable transmission are structured and operated in the above-mentioned manner, the assembling operation of the toroidal-type continuously variable transmission can be carried out with enhanced efficiency, which makes it possible to reduce the cost of the toroidal-type continuously variable transmission.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A loading cam device for a toroidal-type continuously variable transmission comprising:

an input shaft including a flange portion at its one end portion;

a circular-ring-shaped cam plate supported on the inner surface of the flange portion of said input shaft, the circular-ring-shaped cam plate including, at its inner surface, a drive side cam surface which comprises an uneven surface extending in the circumferential direction of said cam plate;

an input side disk including an outer surface and an inner surface, and the input side disk being supported by the input shaft in such a manner that it is allowed not only to shift in the axial direction of the input shaft with respect to the input shaft but also to rotate in synchronization with the input shaft, the outer surface being disposed opposed to the drive side cam surface of the cam plate and formed as a driven side cam surface comprising an uneven surface extending in the circumferential direction of the input side disk, and the inner surface being disposed on the opposite side to the outer surface in the axial direction of the input side disk and formed as a concave-shaped surface having an arc-shaped section;

a plurality of rollers respectively held by and between the drive side cam surface and the driven side cam surface; and a retainer for holding the plurality of rollers in a freely rotatable manner, wherein, of the loading cam device, not only the input shaft, the cam plate, the input side disk, the rollers and the retainer which are parts produced separately from one another, are previously assembled so as to have such positional relationship that should be provided after completion of assembly of a toroidal-type continuously variable transmission, before they are actually assembled to the toroidal-type continuously variable transmission, but also the thrust of the loading cam to be generated due to the mutual relative rotation between the cam plate and the input side disk is previously measured.

2. The loading cam device according to claim 1, further comprising:

an angular-type ball bearing provided on said input shaft for rotatably supporting said cam plate, in which said angular-type ball bearing comprises an inner race raceway formed on said inner surface of said flange portion, an outer race raceway formed on the inner peripheral edge portion of said outer surface of said cam plate, and a plurality of balls respectively interposed between said inner race raceway and said outer race raceway in a freely rotatable manner.

3. The loading cam device according to claim 1, further comprising:

a ball spline between said input shaft and said input side disk.

4. The loading cam device according to claim 1, further comprising:

a countersunk plate spring provided between said input shaft and said input side disk in the axial direction of the input shaft so as to apply a pre-load.

5. The loading cam device according to claim 4, further comprising:

a thrust needle roller bearing provided between said input shaft and said input side disk.

6. An apparatus for measuring thrust of a loading cam device for a toroidal-type continuously variable transmission, wherein said loading cam device comprises, an input shaft including a flange portion at its one end portion;

a circular-ring-shaped cam plate supported on the inner surface of the flange portion of said input shaft, the circular-ring-shaped cam plate including, at its inner surface, a drive side cam surface which comprises an uneven surface extending in the circumferential direction of said cam plate;

an input side disk including an outer surface and an inner surface, and the input side disk being supported by the input shaft in such a manner that it is allowed not only to shift in the axial direction of the input shaft with respect to the input shaft but also to rotate in synchronization with the input shaft, the outer surface being disposed opposed to the drive side cam surface of the cam plate and formed as a driven side cam surface comprising an uneven surface extending in the circumferential direction of the input side disk, and the inner surface being disposed on the opposite side to the outer surface in the axial direction of the input side disk and formed as a concave-shaped surface having an arc-shaped section;

a plurality of rollers respectively held by and between the drive side cam surface and the driven side cam surface; and a retainer for holding the plurality of rollers in a freely rotatable manner, wherein said thrust measuring device comprises:

a drive member for rotationally driving said cam plate;

a retaining member for preventing said input disk from shifting in a direction where said input side disk goes away from said cam plate; and a sensor for measuring a thrust load applied to said input side disk due to said rotation of said cam plate driven by said drive member, and wherein said sensor measures the thrust of said loading cam device which includes said drive side cam surface, said driven side cam surface and said rollers, in a state where said input shaft, said cam plate, said input side disk, said rollers and said retainer are previously assembled so as to have such positional relationship that is provided after completion of assembly of the toroidal-type continuously variable transmission before they are actually assembled to said toroidal-type continuously variable transmission.

7. A method for assembling a toroidal-type continuously variable transmission, said toroidal-type continuously variable transmission comprising:

an input shaft including a flange portion at its one end portion;

a circular-ring-shaped cam plate supported on the inner surface of the flange portion of the input shaft, the circular-ring-shaped cam plate including, at its inner surface, a drive side cam surface which comprises an uneven surface extending in the circumferential direction of the cam plate;

an input side disk including an outer surface and an inner surface, and the input side disk being supported on the periphery of the input shaft in such a manner that it is allowed not only to shift in the axial direction of the input shaft with respect to the input shaft but also to rotate in synchronization with the input shaft, the outer surface being disposed opposed to the drive side cam surface of the cam plate and formed as a driven side cam surface comprising an uneven surface extending in the circumferential direction of the input side disk, and the inner surface being disposed on the opposite side to the outer surface in the axial direction of the input side disk and formed as a concave-shaped surface having an arc-shaped section;

a plurality of rollers respectively held by and between the drive side cam surface and the driven side cam surface; and a retainer for holding the plurality of rollers in a freely rotatable manner, said assembling method comprising the steps of:

previously assembling said input shaft, said cam plate, said input side disk, said rollers and said retainer which are parts produced separately from one another so as to have such positional relationship that is provided after completion of assembly of said toroidal-type continuously variable transmission, before they are actually assembled to said toroidal-type continuously variable transmission, thereby forming the loading cam device;

measuring thrust to be generated due to the mutual relative rotation between said cam plate and said input side disk of said loading cam device; and, after then, measuring thrust to be generated due to the mutual relative rotation between said cam plate and said input side disk of said loading cam device; and, after then, combining said loading cam device with other component parts of said toroidal-type continuously variable transmission, thereby completing assembly of said toroidal-type continuously variable transmission.

8. The method for assembling the toroidal-type continuously variable according to claim 7, wherein said previously assemblying step further comprises the steps of:

providing on said input shaft an angular-type ball bearing which rotatably supporting said cam plate, in which said angular-type ball bearing comprises an inner race raceway formed on said inner surface of said flange portion, an outer race raceway formed on the inner peripheral edge portion of said outer surface of said cam plate, and a plurality of balls respectively interposed between said inner race raceway and said outer race raceway in a freely rotatable manner.

9. The method for assembling the toroidal-type continuously variable according to claim 8, wherein said previously assemblying step further comprises the steps of:

providing a ball spline between said input shaft and said input side disk.

10. The method for assembling the toroidal-type continuously variable according to claim 8, wherein said previously assemblying step further comprises the steps of:

providing a countersunk plate spring between said input shaft and said input side disk in the axial direction of the input shaft so as to apply a pre-load.

11. The method for assembling the toroidal-type continuously variable according to claim 8, wherein said previously assemblying step further comprises the steps of:

providing a thrust needle roller bearing between said input shaft and said input side disk.

* * * * *